United States Patent [19]
Mori et al.

[11] Patent Number: 5,632,595
[45] Date of Patent: May 27, 1997

[54] GLASS PLATE CONVEYING APPARATUS

[75] Inventors: Takeshi Mori; Masato Nakamura; Eiji Nakayama, all of Matsusaka, Japan

[73] Assignee: Central Glass Co., Ltd., Japan

[21] Appl. No.: 413,155

[22] Filed: Mar. 29, 1995

[30] Foreign Application Priority Data

Mar. 29, 1994 [JP] Japan .................... 6-058988

[51] Int. Cl.$^6$ .................................. B65G 59/00
[52] U.S. Cl. ............... 414/795.6; 414/797; 414/797.1
[58] Field of Search ................ 414/788, 789.5, 414/795.4, 795.6, 797, 797.1

[56] References Cited

U.S. PATENT DOCUMENTS

| | | | |
|---|---|---|---|
| 3,693,321 | 9/1972 | Nilsson | 414/797 |
| 4,419,176 | 12/1983 | Valimont et al. | 414/797 |
| 4,863,340 | 9/1989 | Masunaga et al. | 414/789.5 |
| 5,256,030 | 10/1993 | Tanako et al. | 414/797 |

FOREIGN PATENT DOCUMENTS

| | | |
|---|---|---|
| 2-43143 | 2/1990 | Japan . |
| 5-16979 | 1/1993 | Japan . |

Primary Examiner—David A. Bucci
Assistant Examiner—Gregory A. Morse
Attorney, Agent, or Firm—Cushman Darby & Cushman Intellectual Property Group of Pillsbury Madison & Sutro, LLP

[57] ABSTRACT

A glass plate conveying apparatus has a movable robot arm, a first suction device for attracting glass plates which are stacked and rested against a support member, a second suction device for attracting guard sheets which are inserted between the stacked glass plates, an electromagnetic device, interchangeable with the second suction device for attracting spacers made of magnetic material which are inserted between the stacked glass plates, and an adjusting device for adjusting the vertical position of the second suction device or the electromagnetic device. The first suction device is detachably mounted on the robot arm. The second suction device is detachably mounted on the robot arm. The electromagnetic device is detachably mounted on the robot arm. The second suction device and the electromagnetic device are interchangeably mounted on the robot arm.

4 Claims, 4 Drawing Sheets

GLASS PLATE CONVEYING APPARATUS

BACKGROUND OF THE INVENTION

The present invention relates to a glass plate conveying apparatus for separating glass plates from a stack, supported by a support member and having guard sheets or spacers inserted between the glass plates, into separated glass plates and guard sheets or spacers, and conveying the separated glass plates to another operation site.

Various kinds of glass plate conveying apparatuses have been proposed for conveying glass plates stacked and supported by a support member to another operation site. For example, Japanese Patent Laid-Open Publication Hei 2-43143 discloses a glass plate conveying apparatus comprising a suction hand which has a hand base, two sets of suction pads which are separately mounted on the hand base, two sets of driving and locking devices for driving the suction pads independently and locking them at appropriate positions in accordance with stop signals. A position detecting device is provided including a detecting rod and a position sensor for detecting the distance between the suction pads (which are in retracted positions) and a plate member (which is to be attracted to the suction pads) and starting the driving and locking devices when the distance becomes a predetermined value. A movable robot arm is provided on which the suction hand is mounted. Japanese Patent Laid-Open Publication Hei 5-16979 discloses a glass plate conveying apparatus comprising a framework mounted on a robot arm, a plurality of suction pads mounted on the framework, a pair of electromagnetic holders mounted on the framework, each of the electromagnetic holders being capable of swinging around an axis parallel to the plane of the framework, and a device for ejecting pressurized air from the attracting surface of each electromagnetic holder. The above apparatus disclosed in Japanese Patent Laid-Open Publication Hei 5-16979 separates a stack of glass plates, supported by a support member, with spacers made of magnetic material inserted between the plates, into separated glass plates and spacers, and conveys the separated glass plates to another operation site.

The glass plate conveying apparatus disclosed in Japanese Patent Laid-Open Publication Hei 2-43143 can handle stacked and supported glass plates, supported at various angles, but cannot separate stacked plates with guard sheets or spacers inserted between the plates, into separated glass plates and guard sheets or spacers. The glass plate conveying apparatus disclosed in Japanese Patent Laid-Open Publication Hei 5-16979 can separate stacked glass plates with spacers made of magnetic material inserted between them into separated glass plates and spacers, but cannot separate stacked glass plates with guard sheets inserted between them, into separated glass plates and guard sheets.

SUMMARY OF THE INVENTION

An object of the present invention is to provide a glass plate conveying apparatus which has a glass plate attracting device, a guard sheet attracting device, a spacer attracting device, and a device for exchanging the guard sheet attracting device for the spacer attracting device or vice versa, wherein an exchange between the guard sheet attracting device and the spacer attracting device can be carried out easily and promptly.

According to the present invention, there is provided a glass plate conveying apparatus comprising a movable robot arm, and first suction means for attracting glass plates which are stacked and rested against a support member. The first suction means are detachably mounted on the robot arm. Second suction means are provided for attracting guard sheets which are inserted between the stacked glass plates. The second suction means are also detachably mounted on the robot arm. Electromagnetic means are provided for attracting spacers made of magnetic material which are inserted between the stacked glass plates. The electromagnetic means are detachably mounted on the robot arm. The second suction means and the electromagnetic means are interchangeably mounted on the robot arm, and adjusting means are provided for adjusting the vertical position of the second suction means and the electromagnetic means.

According to a preferred embodiment of the present invention, the second suction means has a pair of suction pads transversely spaced from each other, means for adjusting the transverse distance between the suction pads, and means for moving the pair of suction pads longitudinally. The electromagnetic means preferably has a pair of electromagnets transversely spaced from each other, means for adjusting the transverse distance between the electromagnets, and means for moving the pair of electromagnets longitudinally.

According to another preferred embodiment of the present invention, the means for adjusting the vertical position of the second suction means or the electromagnetic means has a sliding block which is mounted on the robot arm slidably in the vertical direction and provided with a pair of vertical through holes. The second suction means is provided with a pair of vertical rods to be inserted upwardly into the vertical through holes of the sliding block, and a toggle clamp by which the second suction means is detachably mounted on the sliding block. The electromagnetic means is provided with a pair of vertical rods to be inserted downwardly into the vertical through holes of the sliding block, and a toggle clamp by which the electromagnetic means is detachably mounted on the sliding block.

Further objects, features and advantages of the present invention will become apparent from the Detailed Description of the Preferred Embodiment when read in conjunction with the accompanying drawings.

DETAILED DESCRIPTION OF THE INVENTION

A glass plate conveying apparatus in accordance with a preferred embodiment of the present invention will be described with reference to FIGS. 1 to 5. In the following description, the directions indicated by arrows I, II, III, IV, V and VI in FIGS. 1 to 5 are referred to as the forward direction, rearward direction, rightward direction, leftward direction, upward direction and downward direction, respectively. Moreover, in the following description, a direction parallel to the arrows I, II is referred to as the longitudinal direction, a direction parallel to the arrows III, IV is referred to as the transverse direction, and a direction parallel to the arrows V, VI is referred to as the vertical direction.

Figure 1:
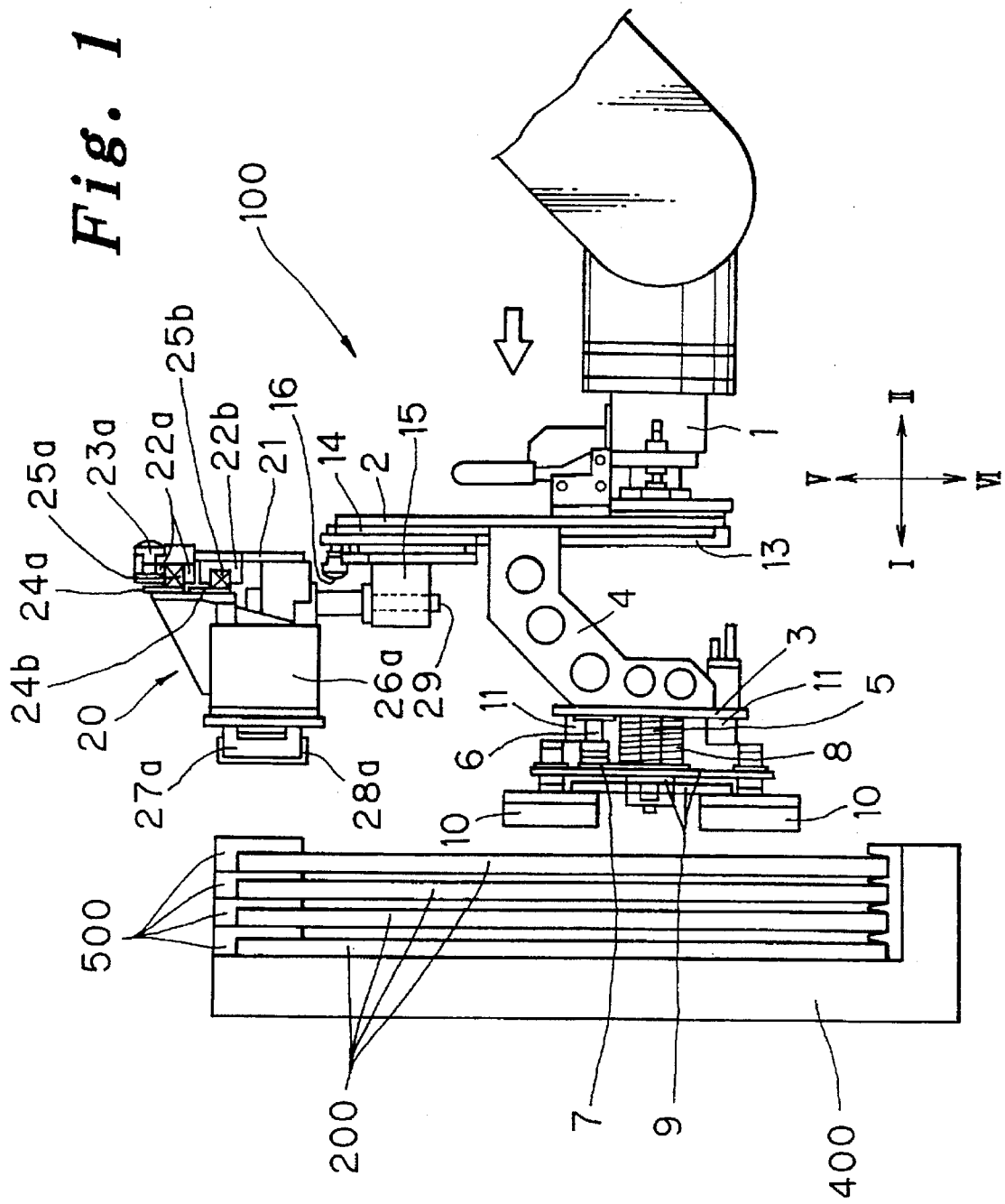
FIG. 1 is a side view showing the structure of a glass plate conveying apparatus, provided with an electromagnetic attracting device, in accordance with a preferred embodiment of the present invention.
Figure 2:
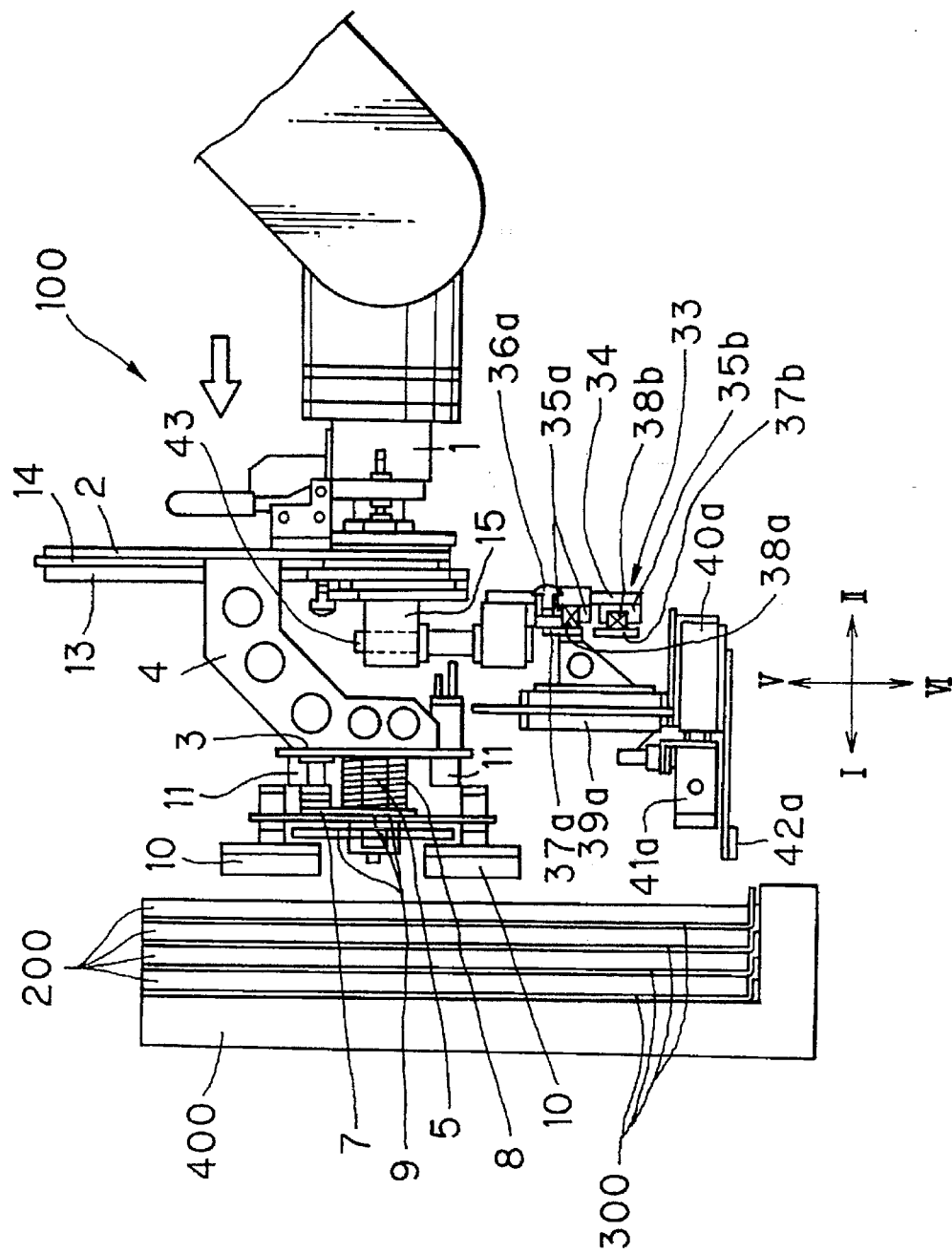
FIG. 2 is a side view showing the structure of a glass plate conveying apparatus, provided with a vacuum attracting device, in accordance with a preferred embodiment of the present invention.
Figure 3:
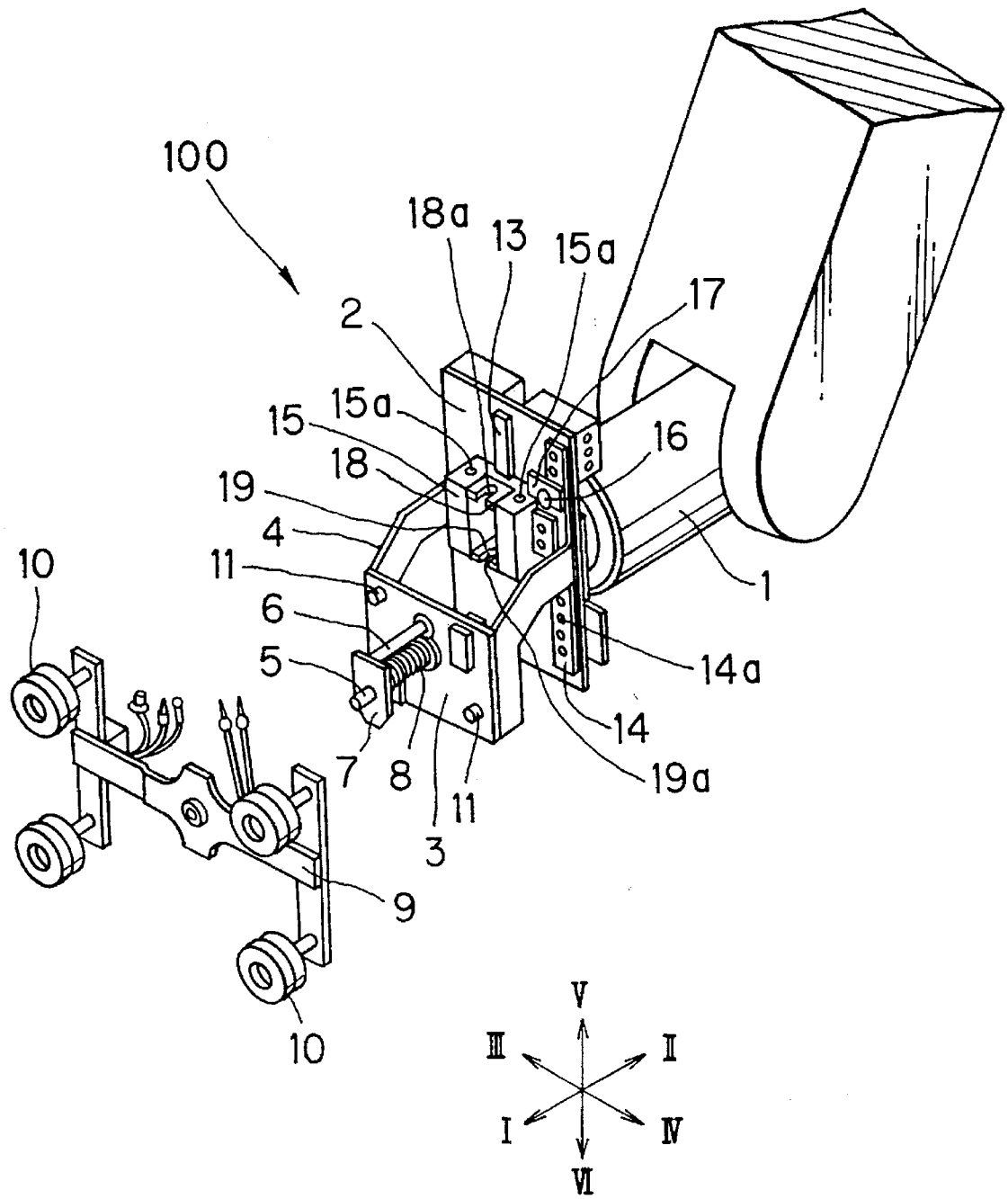
FIG. 3 is a perspective view showing the structure of a vacuum attracting device for attracting glass plates which are stacked and rested against a support member.

As shown in FIGS. 1 to 3, a glass plate conveying apparatus 100 has a robot arm 1 and a base 2 mounted on the front end of the robot arm 1.

A plate member 3 is disposed in front of the base 2 and is fixed to the base 2 through a pair of brackets 4. Longitudinal rods 5 and 6 slidably penetrate the plate member 3. Rods 5 and 6 are prevented from being released forward from the plate member 3. The front portion of the rod 5 penetrates a flange plate 7 disposed in front of the plate member 3 and is fixed to the flange plate 7. The front end of the rod 6 is also fixed to the flange plate 7. A coil spring 8 fits around the rod 5 between the plate member 3 and the flange plate 7. A framework 9 is penetrated by and detachably connected to the rod 5 at its center. The framework 9 is prevented from rotating around the rod 5. The framework 9 abuts against the flange plate 7. A plurality of suction pads 10 are mounted on the front surface of the framework 9. A plurality of frameworks 9 of various sizes are stocked for handling glass plates of various sizes. The suction pads 10 can be connected to evacuating tubes (not shown). Three position sensors 11 are mounted on the right upper corner, the right lower corner, and the left lower corner of the front surface of the plate member 3. The position sensors 11 are electrically connected to the control unit (not shown) of the robot arm 1.

A vertically extending rail 13 is fixed to the front surface of the base 2. A vertically extending locating plate 14 is disposed to the left of the rail 13 and fixed to the front surface of the base 2. A plurality of vertically aligned through holes 14a are formed in the locating plate 14.

A channel-shaped slide block 15 slidably engages the rail 13. A pair of vertical through holes 15a are formed in the channel-shaped slide block 15. A longitudinally extending locating knob 16 is mounted on the left upper surface of the slide block 15 through a bracket 17. The locating knob 16 is biased rearward by a spring (not shown) so that it fits into one of the through holes 14a formed in the locating plate 14 at its rear end. Thus, the slide block 15 is fixed to the base 2. The slide block 15 is released from the base 2 by pulling the locating knob 16 forward out of the through hole 14a against the biasing force of the spring. An engaging plate 18 which has a U-shaped cutout 18a is fitted in the upper end of the groove of the channel-shaped slide block 15 and fixed to the channel-shaped slide block 15. An engaging plate 19 which has a U-shaped cutout 19a is fitted in the lower end of the groove of the channel-shaped slide block 15 and fixed to the channel-shaped slide block 15.

Figure 4:
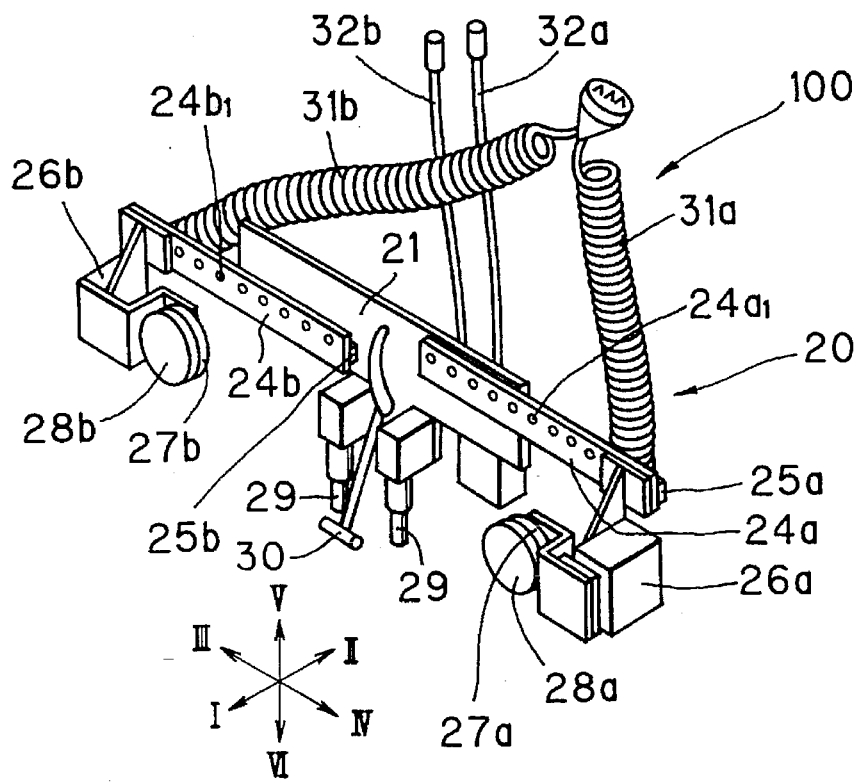
FIG. 4 is a perspective view showing the structure of an electromagnetic attracting device for attracting spacers inserted between the glass plates.

As shown in FIGS. 1 and 4, an electromagnetic attracting device 20 has a base plate 21.

A transversely extending guide 22a is fixed to the left upper portion of the front surface of the base plate 21. A longitudinally extending locating knob 23a slidably penetrates the left upper portion of the base plate 21. The knob 23a is biased forward by a spring (not shown). A transversely extending locating plate 24a is provided with a transversely extending rail 25a at its rear surface. A plurality of transversely aligned through holes $24a_1$ are formed in the locating plate 24a. The rail 25a slidably engages the guide 22a. The locating knob 23a, which is biased forward by the spring, fits into one of the through holes $24a_1$ at its fore end. Thus, the locating plate 24a is fixed to the base plate 21. The locating plate 24a is released from the base plate 21 by pulling the locating knob 23a rearward out of the through hole $24a_1$ against the biasing force of the spring. A longitudinally directed air cylinder 26a is fixed to the left end portion of the locating plate 24a. An electromagnet 27a is fixed to the front end of a forwardly extending piston of the air cylinder 26a. The front portion of the electromagnet 27a is covered with a rubber cap 28a. Compressed air can be blown into the space between the rubber cap 28a and the front surface of the electromagnet 27a.

A transversely extending guide 22b is fixed to the right lower portion of the front surface of the base plate 21. A longitudinally extending locating knob (not shown) slidably penetrates the right lower portion of the base plate 21. The knob is biased forward by a spring (not shown). A transversely extending locating plate 24b is provided with a transversely extending rail 25b at its rear surface. A plurality of transversely aligned through holes $24b_1$ are formed in the locating plate 24b. The rail 25b slidably engages the guide 22b. The locating knob, which is biased forward by the spring, fits into one of the through holes $24b_1$ at its fore end. Thus, the locating plate 24b is fixed to the base plate 21. The locating plate 24b is released from the base plate 21 by pulling the locating knob rearward out of the through holes $24b_1$ against the biasing force of the spring. A longitudinally directed air cylinder 26b is fixed to the right end portion of the locating plate 24b. An electromagnet 27b is fixed to the front end of a forwardly extending piston of the air cylinder 26b. The front portion of the electromagnet 27b is covered with a rubber cap 28b. Compressed air can be blown into the space between the rubber cap 28b and the front surface of the electromagnet 27b.

A pair of downwardly extending rods 29 are fixed to the base plate 21. A toggle clamp 30 which is T-shaped at its lower end is mounted on the base plate 21 between the rods 29.

The air cylinders 26a, 26b are respectively connected to air supply tubes 31a, 31b through electromagnetic valves (not shown). The spaces between the rubber caps 28a, 28b and the front surfaces of the electromagnets 27a, 27b are also respectively connected to the air supply tubes 31a, 31b through electromagnetic valves (not shown). The electromagnets 27a, 27b are connected to electric wires 32a, 32b respectively.

Figure 5:
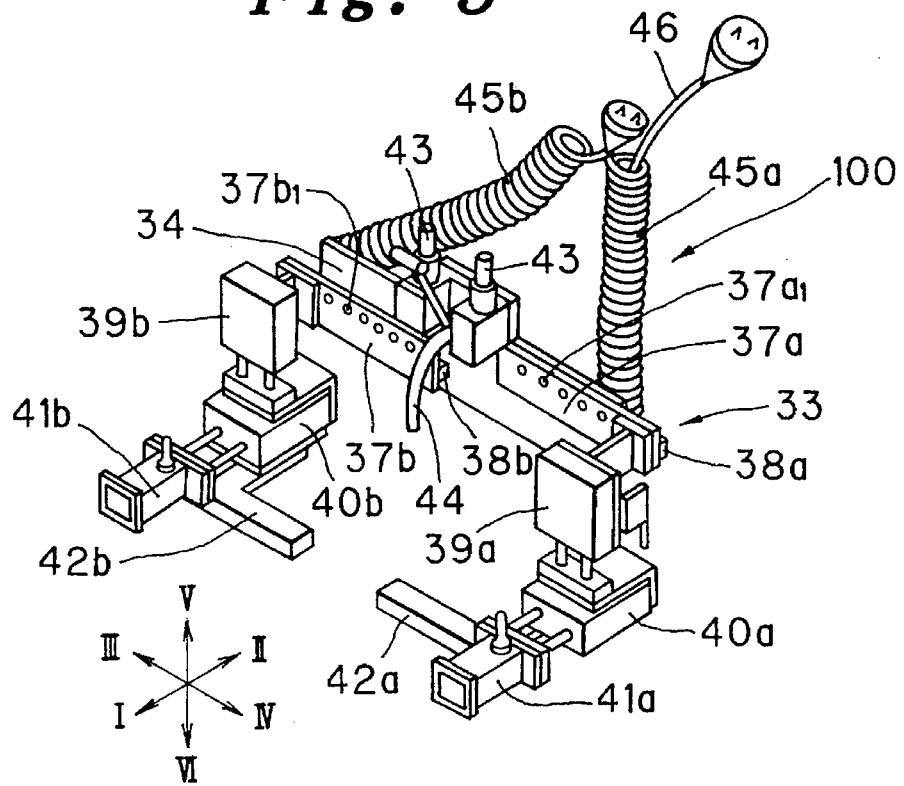
FIG. 5 is a perspective view showing the structure of a vacuum attracting device for attracting guard sheets inserted between the glass plates.

As shown in FIGS. 2 and 5, a vacuum attracting device 33 has a base plate 34.

A transversely extending guide 35a is fixed to the left upper portion of the base plate 34. A longitudinally extending locating knob 36a slidably penetrates the left upper portion of the base plate 34. The knob 36a is forced forward by a spring (not shown). A transversely extending locating plate 37a is provided with a transversely extending rail 38a at its rear surface. A plurality of transversely aligned through holes $37a_1$ are formed in the locating plate 37a. The rail 38a slidably engages the guide 35a. The locating knob 36a, which is biased forward by the spring, fits into one of the through holes $37a_1$ at its fore end. Thus, the locating plate 37a is fixed to the base plate 34. The locating plate 37a is released from the base plate 34 by pulling the locating knob 36a rearward out of the through hole $37a_1$ against the biasing force of the spring. A vertically directed air cylinder 39a is fixed to the left end portion of the front surface of the locating plate 37a. A longitudinally directed air cylinder 40a is fixed to the lower end of a downwardly extending piston of the air cylinder 39a. An eductor pad 41a is fixed to the front end of a forwardly extending piston of the air cylinder 40a. An elbow-shaped guard sheet press bar 42a is fixed to the air cylinder 40a.

A transversely extending guide 35b is fixed to the right lower portion of the base plate 34. A longitudinally extending locating knob (not shown) slidably penetrates the right lower portion of the base plate 34. The knob is biased forward by a spring (not shown). A transversely extending locating plate 37b is provided with a transversely extending rail 38b at its rear surface. A plurality of transversely aligned through holes $37b_1$ are formed in the locating plate 37b. The rail 38b slidably engages the guide 35b. The locating knob, which is biased forward by the spring, fits into one of the through holes $37b_1$ at its fore end. Thus, the locating plate 37b is fixed to the base plate 34. The locating plate 37b is released from the base plate 34 by pulling the locating knob rearward out of the through hole $37b_1$ against the biasing force of the spring. A vertically directed air cylinder 39b is fixed to the right end portion of the front surface of the locating plate 37b. A longitudinally directed air cylinder 40b is fixed to the lower end of a downwardly extending piston of the air cylinder 39b. An eductor pad 41b is fixed to the front end of a forwardly extending piston of the air cylinder 40b. An elbow-shaped guard sheet press bar 42b is fixed to the air cylinder 40b.

A pair of upwardly extending rods 43 are fixed to the base plate 34. A toggle clamp 44 which is T-shaped at its upper end is mounted on the base plate 34 between the rods 43.

The air cylinders 39a and 40a, 39b and 40b are connected to the air supply tubes 45a, 45b through electromagnetic valves (not shown) respectively. The eductor pads 41a, 41b are connected to air supply tube 46 through electromagnetic valves (not shown) respectively.

The glass plate conveying apparatus 100 operates as follows.

As shown in FIG. 2, the robot arm 1 is moved to an operation site where glass plates 200 are stacked with guard sheets 300 inserted between them and supported by or rested against a pallet 400. The lower ends of the guard sheets 300 which protrude from the lower ends of the glass plates 200 are bent at right angles and extend rearward beyond the adjacent glass plates 200.

A framework 9 of the most suitable size for handling the glass plates 200 is selected from those in stock. The selected framework 9 is set on and connected to the rod 5. The suction pads 10 are connected to an evacuation tube (not shown) which is connected to a vacuum supply (not shown).

The locating knob 16 (see FIG. 3) is pulled forward out of a through hole 14a (not shown) formed in the locating plate 14 against the biasing force of the spring so that the slide block 15 is released from the base 2. The slide block 15 is vertically slid along the rail 13 to an appropriate vertical position.

Then the locating knob 16 fits into the through hole 14a so that the slide block 15 is fixed to the base 2. The pair of rods 43 of the vacuum attracting device 33 are inserted upwardly into the pair of vertical through holes 15a (see FIG. 3) of the slide block 15. The T-shaped top of the toggle clamp 44 is engaged with the U-shaped cutout 19a of the engaging plate 19. Thus, the vacuum attracting device 33 is fixed to the base 2.

The locating knob 36a is pulled rearward out of the through hole $37a_1$ so that the locating plate 37a is released from the base plate 34. The locating plate 37a is slid transversely along the guide 35a to a transverse position suitable for handling the glass plates 200. Then, the locating plate 37a is fixed to the base plate 34 by making the locating knob 36a fit into the through hole $37a_1$. The locating plate 37b is located at a transverse position suitable for handling the glass plates 200 and fixed to the base plate 34 in the same way as the locating plate 37a.

The air supply tubes 45a, 45b and 46 are connected to a compressed air supply (not shown).

The glass plate conveying apparatus 100 provided with the vacuum attracting device 33 is now ready for operation, as shown in FIG. 2.

As indicated by an arrow in FIG. 2, the robot arm 1 is moved forward toward the glass plates 200 stacked with guard sheets 300 inserted between them and rested against the pallet 400. The suction pads 10 abut against the rear surface of the rearmost glass plate 200. The suction pads 10 can softly abut against the glass plate 200, because the distance between the framework 9 and the glass plate 200 is monitored by the position sensors 11 and the movement of the robot arm 1 is controlled based on the position signals from the position sensors 11 to maintain the framework 9 parallel to the glass plate 200, and because the framework 9 on which the suction pads 10 are mounted can move rearward against the biasing force of the coil spring 8. The suction pads 10 are evacuated so as to attract the rearmost glass plate 200.

The air cylinders 39a, 39b start. The guard sheet 300, inserted between the rearmost glass plate 200 and the adjacent glass plate 200 is pressed down against the pallet 400. Specifically, sheet 300 is pressed down at its lower end (bent at right angles and extending rearward beyond the rearmost glass plate 200) by the guard sheet press bars 42a, 42b.

The robot arm 1 is moved slightly rearward and upward so that the rearmost glass plate 200 attracted by the suction pads 10 is moved slightly rearward and upward. The air cylinders 39a, 39b move slightly downward synchronously with the upward movement of the robot arm 1 so that the guard sheet press bars 42a, 42b keep pressing the lower end of the guard sheet 300 down against the pallet 400. Thus, the lower end portion of the guard sheet 300 between the rearmost glass plate 200 and the adjacent glass plate 200 is exposed. The air cylinders 40a, 40b start so that the eductor pads 41a, 41b abut against the exposed lower end portion of the guard sheet 300. The eductor pads 41a, 41b are evacuated by means of compressed air. Thus, the eductor pads 41a, 41b attract the guard sheet 300.

The robot arm 1 is moved to the next operation site. When the robot arm 1 comes to a predetermined place, the evacuation of the eductor pads 41a, 41b is stopped so that the guard sheet 300 is dropped at the predetermined place and recovered. When the robot arm 1 reaches the next operation site, the evacuation of the suction pads 10 is stopped so that the rearmost glass plate 200 is rested against a pallet, for example, positioned at the next operation site.

The air cylinders 39a, 39b, 40a and 40b are retracted. The robot arm 1 returns to the first operation site where the stack of glass plates 200 with guard sheets 300 inserted between them is rested against the pallet 400.

When the glass plates 200 are stacked with spacers 500 made of magnetic material inserted between them and rested against the pallet 400 as shown in FIG. 1, the glass plate conveying apparatus 100 operates as follows.

The toggle clamp 44 is released from engagement with the engaging plate 19. The vacuum attracting device 33 is moved downwardly until the pair of rods 43 comes out from the vertical through holes 15a of the slide block 15. Thus, the vacuum attracting device 33 is removed. The locating knob 16 is pulled forward out of the through hole 14a so that the slide block 15 is released from the base 2. The slide block 15 is vertically slid along the rail 13 to an appropriate vertical position. Then the slide block 15 is fixed to the base 2 by making the locating knob 16 fit into the through hole 14a.

The pair of rods 29 of the electromagnetic attracting device 20 are inserted downwardly into the pair of through holes 15a of the slide block 15. The T-shaped lower end of the toggle clamp 30 is engaged with the U-shaped cutout 18a of the engaging plate 18. Thus, the electromagnetic attracting device 20 is fixed to the base 2.

The locating knob 23a is pulled rearward out of the through hole 24a$_1$ so that the locating plate 24a is released from the base plate 21. The locating plate 24a is slid transversely along the guide 22a to a transverse position suitable for handling the magnetic spacers 500 of glass plates 200. Then, the locating plate 24a is fixed to the base plate 21 by making the locating knob 23a fit into the through hole 24a$_1$. The locating plate 24b is located at a transverse position suitable for handling the magnetic spacers 500 of glass plates 200 and fixed to the base plate 21 in the same way as that in the locating plate 24a.

Thus, the electromagnets 27a, 27b are located at positions suitable for handling the magnetic spacers 500 of glass plates 200. The air supply tubes 31a, 31b are connected to a compressed air supply (not shown). The electric wires 32a, 32b are connected to an electric power supply.

The glass plate conveying apparatus 100 provided with the electromagnetic attracting device 20 is now ready for operation, as shown in FIG. 1.

As indicated by an arrow in FIG. 1, the robot arm 1 is moved forward toward the stack, rested against the pallet 400,of glass plates 200 with spacers 500 made of magnetic material inserted between them. The suction pads 10 softly abut against the rear surface of the rearmost glass plate 200. The suction pads 10 are evacuated for attracting the rearmost glass plate 200. The air cylinders 26a, 26b start so that the electromagnets 27a, 27b attract the rearmost spacer 500.

The robot arm 1 is moved to the next operation site. When the robot arm reaches the next operation site, the evacuation of the suction pads 10 is stopped so that the rearmost glass plate 200 is rested against a pallet disposed there.

Then the robot arm 1 returns to the first operation site where the glass plates 200 are stacked with spacers 500 inserted between them, and rested against the pallet 400. When the robot arm 1 comes to a predetermined position, the electric power supply to the electromagnet 27a, 27b is stopped. The spaces between the rubber caps 28a, 28b and the front surfaces of the electromagnets 27a, 27b are supplied with compressed air so as to be expanded. Thus, the distances between the electromagnets 27a, 27b and the rearmost spacer 500 are enlarged, and the rearmost spacer 500 is dropped immediately and recovered. The air cylinders 26a, 26b are then retracted.

As is clear from the above description, in the glass plate conveying apparatus 100, the exchange between the vacuum attracting device (guard sheet attracting device) 33 and the electromagnetic attracting device (spacer attracting device) 20 can be carried out easily and promptly. When the glass plates 200 are large sized, a large sized framework 9 can be selected from among the plurality of various sized frameworks in stock. When the glass plates 200 are large in the vertical direction, the framework 9 shown in FIG. 3 can be rotated by 90° around a longitudinal axis before it is set on the rod 5. The distance between the eductor pads 41a and 41b, and between the electromagnets 27a and 27b can be easily adjusted in line with the transverse size of the glass plate 200. The vertical position of the eductor pads 41a, 41b, and of the electromagnets 27a, 27b can be easily adjusted in line with the vertical size of the glass plate 200.

While the present invention has been described with reference to the preferred embodiment, one of ordinary skill in the art will recognize that modifications and improvements may be made while remaining within the spirit and scope of the present invention. The scope of the invention is determined solely by the appended claims.

What is claimed is:

1. A glass plate conveying apparatus, for separating glass plates from a stack of glass plates having one of guard sheets and spacers inserted between the glass plates, comprising:

a movable robot arm;

first suction means for attracting glass plates, the first suction means being detachably mounted on the robot arm;

second suction means for attracting guard sheets inserted between the glass plates, the second suction means adapted to be selectively detachably mounted on the robot arm; and means for making a vertical position of said second suction means be adjustable, wherein the means for making the vertical position of the second suction means be adjustable has a sliding block which is mounted on the robot arm slidably in the vertical direction and provided with a pair of vertical through holes;

wherein the second suction means is provided with a pair of vertical rods adapted to be inserted upwardly into the by which the second suction means is detachably mounted on the sliding block.

2. A glass plate conveying apparatus of claim 1, wherein, the second suction means has a pair of suction pads transversely spaced from one another, means for adjusting the transverse distance between the suction pads, and means for moving the pair of suction pads longitudinally.

3. A glass plate conveying apparatus for separating glass plates from a stack of glass plates having one guard sheets and spacers inserted between the glass plates, comprising:

a movable robot arm;

first suction means for attracting glass plates, the first suction means being detachably mounted on the robot arm;

electromagnetic means for attracting spacers made of magnetic material inserted between the glass plates, the electromagnetic means being adapted to be selectively detachably mounted on the robot arm; and means for making a vertical position of said electromagnetic means be adjustable, wherein the means for making the vertical position of the electromagnetic means be adjustable has a sliding block which is mounted on the robot arm slidably in the vertical direction and provided with a pair of vertical through holes; and wherein the electromagnetic means is provided with a pair of vertical rods adapted to be inserted downwardly into the vertical through holes of the sliding block and a toggle clamp by which the electromagnetic means is detachably mounted on the sliding block.

4. A glass plate conveying apparatus of claim 3, wherein the electromagnetic means has a pair of electromagnets transversely spaced from each other, means for adjusting the transverse distance between the electromagnets, and means for moving the pair of electromagnets longitudinally.

* * * * *